United States Patent
Kavanagh

(10) Patent No.: US 6,854,054 B1
(45) Date of Patent: Feb. 8, 2005

(54) SYSTEM AND METHOD OF MEMORY MANAGEMENT FOR PROVIDING DATA STORAGE ACROSS A REBOOT

(75) Inventor: Thomas Kavanagh, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 393 days.

(21) Appl. No.: 10/006,293

(22) Filed: Dec. 6, 2001

(51) Int. Cl.[7] .............................................. G06F 9/00
(52) U.S. Cl. ............................ 713/2; 713/1; 711/166
(58) Field of Search ............................ 711/166; 713/1, 713/2

(56) References Cited

U.S. PATENT DOCUMENTS 5,410,706 A * 4/1995 Farrand et al. ................. 713/2
5,935,242 A * 8/1999 Madany et al. ................. 713/1
6,647,494 B1 * 11/2003 Drews .......................... 713/170
2002/0152425 A1 * 10/2002 Chaiken et al. ............... 714/23

* cited by examiner

Primary Examiner—Christian P. Chace
(74) Attorney, Agent, or Firm—Michael R. Cammarata

(57) ABSTRACT

A memory management system, method and computer readable medium for use in a circuit pack or circuit card such as in a node in an optical network are described. The memory management system includes memory that provides persistent storage over a reboot and a memory manager for directly controlling access to the reboot persistent memory. The memory manager processes requests received from one or more applications executing on the circuit card for storage of a set of data. The request indicates during which type of reboot, cold or warm, the data is to be received and may also indicate a particular state during a reboot in which the data is to be received. The manager responds to a reboot of the circuit card by providing a set of data from the reboot persistent memory to the application during the reboot.

26 Claims, 15 Drawing Sheets

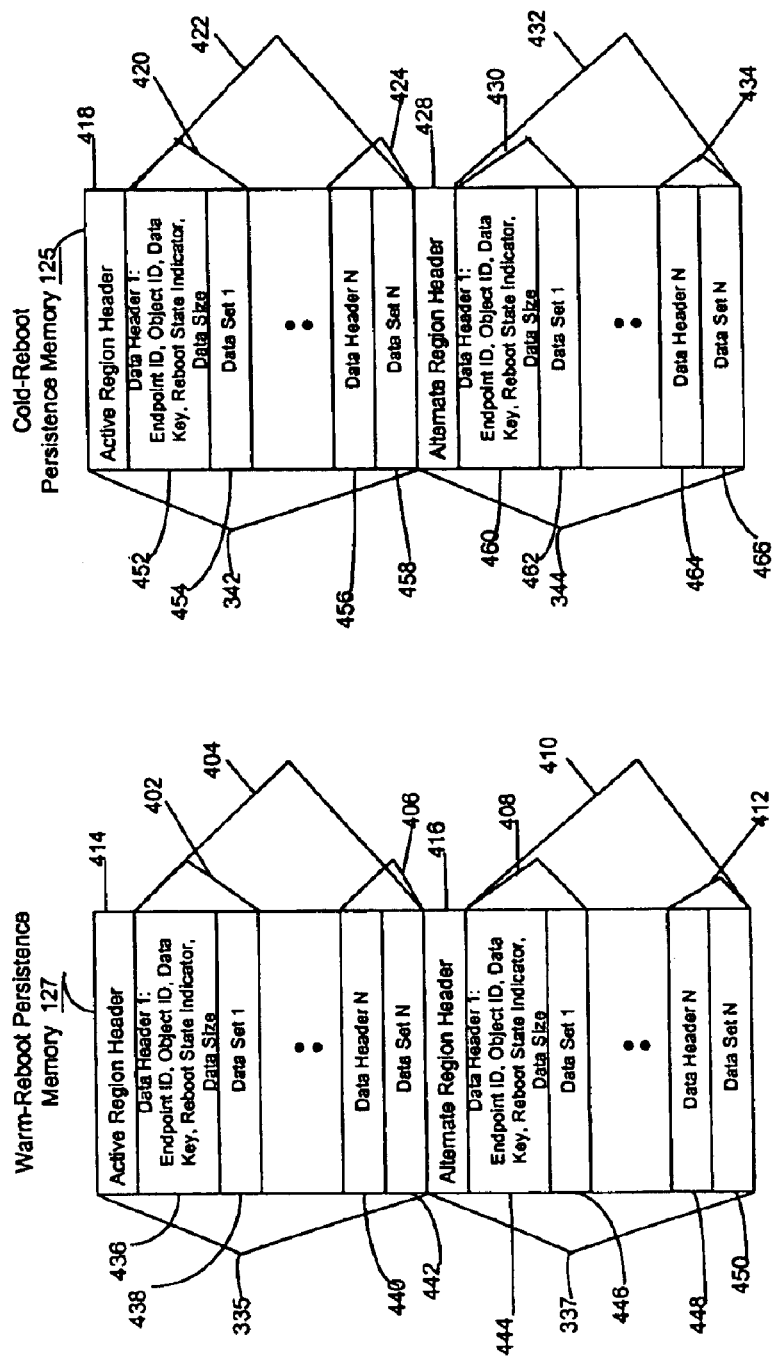

SYSTEM AND METHOD OF MEMORY MANAGEMENT FOR PROVIDING DATA STORAGE ACROSS A REBOOT

FIELD OF INVENTION

The present invention relates generally to memory management, and more particularly to memory management in a communications network.

BACKGROUND

In a system, a software application has data that is desired to be stored persistently. Persistence means that the stored information has to continue to exist even after one or more applications that saved and manipulated the data have ceased to run such as in the situation of either a warm or cold reboot.

Examples of typical memories used for persistent storage of data over reboots are Electrically Erasable Programmable Read Only Memory (EEPROM) and a variant of it, Flash memory. However, Flash memory and EEPROMs are not generally suitable to provide this functionality of persistent storage of data sent by software applications on a continuous basis during normal operation of a system. Neither EEPROM nor Flash memory is designed to be continuously written to as often as would be necessary by software applications running throughout the operation of the system, and would suffer a decreased life span. Flash memory is costly, and EEPROM is slow.

In many solutions, the application is responsible for controlling the allocation of memory and storage of data to be saved over a reboot. A shortcoming of these solutions is their need to use some type of semaphore protection to ensure that one application's access does not affect another's access. For example, the operating system may need to ensure that any memory allocated from non-volatile memory is reassigned to the same application for the same data structure after a reboot.

Furthermore, the application is responsible for controlling the retrieval of persistent application data during a reboot whether it be a warm-reboot or a cold-reboot.

SUMMARY

The present invention provides various embodiments for overcoming the limitations of the prior art.

In one embodiment of the invention, in a circuit card, a memory management system comprises a memory for the persistent storage of data over a reboot from an application executable on the card and a memory manager for directly controlling access to the memory. The memory manager processes requests received from the application for storage of a set of data in the memory. As an example, a request may be embodied within a message.

An example of memory for providing persistent storage over a warm-reboot is random access memory that the operating system is informed not to write over during a warm-reboot. An example of non-volatile memory for persistent storage of data over a cold-reboot is Flash memory. In one embodiment, the memory has an active memory region and an alternate memory region.

In one version of the invention, the memory manager responds to a warm-reboot by providing a set of data to an application during the warm reboot. The set of data has been previously indicated by the application to be sent to the application in the event of a warm-reboot from the warm-reboot persistent memory. In one embodiment, the application may indicate a particular state during a warm-reboot in which the data is to be sent.

In another version of the invention, the memory manager responds to a cold-reboot by providing a set of data previously indicated by an application to be sent to it in the event of a cold-reboot from the cold-reboot persistent memory to the application during the cold-reboot. In one embodiment, the application may indicate a particular state during a cold-reboot in which the data is to be sent.

BRIEF DESCRIPTION OF THE DRAWINGS

FIG. 4B illustrates an embodiment of a ware-reboot persistence memory in accordance with the present invention.

FIG. 4C illustrates an embodiment of a non-volatile cold-reboot persistence memory in accordance with the present invention.

DETAILED DESCRIPTION

In one embodiment, the invention comprises a system having a processor, a memory for persistent storage of data across a reboot, and software stored in memory, the software including software applications, including a memory manager. This system may be embodied within a card. A collection of these cards may be communicatively coupled, for example, via a backplane, to be sub-systems of another system. An example of a system having a collection of cards is a node. Those of skill in the art will appreciate that the invention may be embodied in a node in a network in one of various network topologies, examples of which are ring and mesh topologies.

Figure 1A:
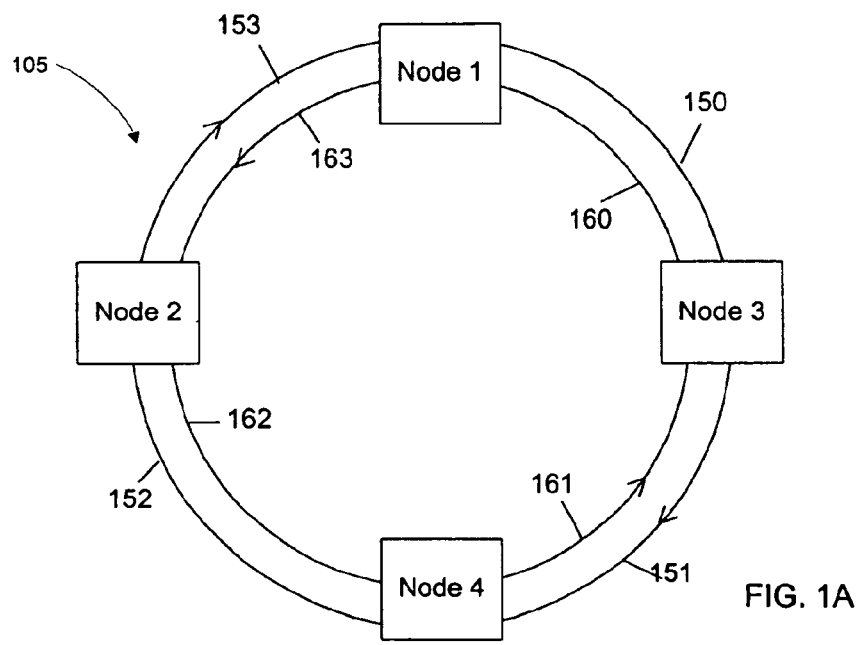
FIG. 1A illustrates an embodiment of a network comprising a plurality of network nodes in a ring topology.

FIG. 1A illustrates an embodiment of a network 105 comprising a plurality of network nodes in a ring topology. As illustrated, each node of nodes 1, 2, 3 and 4 is coupled to another node by a transmission medium 150, 160, 151, 161, 152, 162, 153, 163, so that a bi-directional ring network is formed. An example of a network is a wavelength division multiplexed (WDM) optical network in which a plurality of wavelength channels are carried along an optical transmission medium, an example of which is an optical fiber.

Figure 1B:
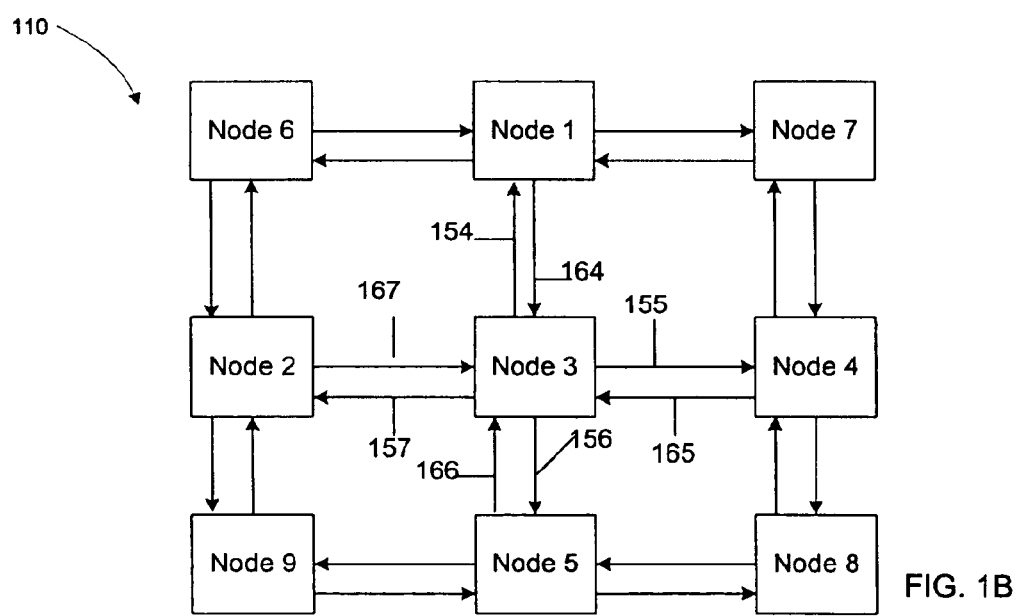
FIG. 1B illustrates an embodiment of a network comprising a plurality of nodes in a mesh topology.

FIG. 1B illustrates an embodiment of a network 110 comprising a plurality of nodes in a mesh topology. The coupling of Node 3 to the other nodes in the mesh is discussed as an illustrative example. Node 3 is coupled bi-directionally by transmission media 154, 164 to Node 1. Node 3 is coupled bi-directionally by transmission media 155, 165 to Node 4. Node 3 is coupled bi-directionally by transmission media 156, 166 to Node 5. Node 3 is coupled bi-directionally by transmission media 157, 167 to Node 2.

In one embodiment, a node is a data and telecommunications transport platform. Examples of activities which processing at a node may comprise include routing and add/drop multiplexing. One type of a node is an optical node that performs activities for processing the optical signals received, transmitted, and passed through the node. An optical node may process one or more wavelengths in the optical filters, that pass through wavelengths that are not added or dropped at the node. A node may also perform optical-to-electrical and electrical-to-optical conversions as part of the processing of wavelengths. For example, when dropping a wavelength from the network to a tributary node, optical-to-electrical conversion may be necessary because of only electrical equipment being on the tributary side or as part of wavelength conversion to a wavelength that can be processed by the tributary node.

Figure 2:
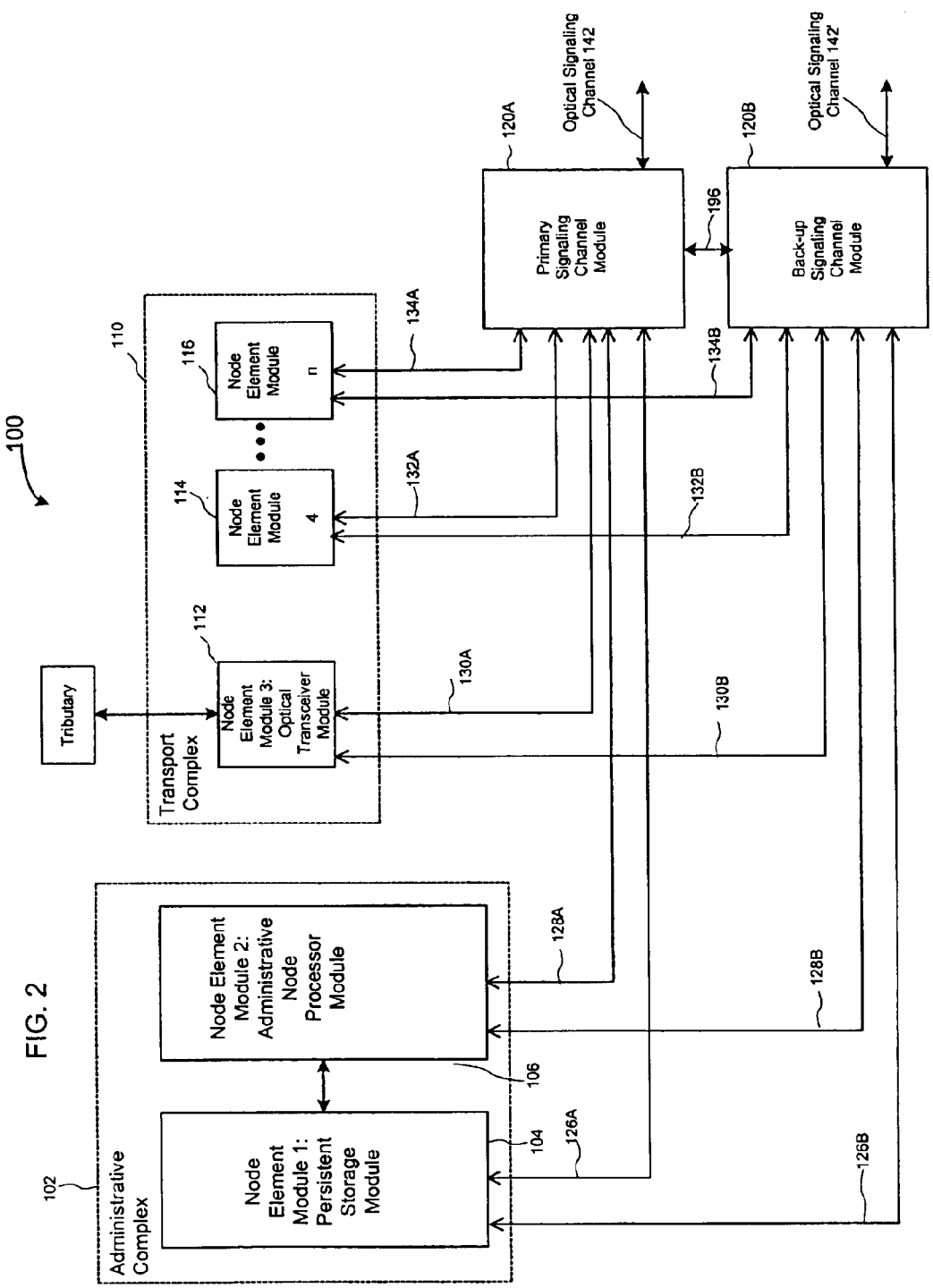
FIG. 2 illustrates an embodiment of an optical node for use in an optical communications network having a plurality of optical nodes in accordance with the present invention.

FIG. 2 illustrates an embodiment of an optical node 100 which may be located in an optical communications network. In this particular embodiment, the node comprises an administrative complex 102, a transport complex 110, a primary signaling channel module 120A and a back-up signaling channel module 120B.

An example of a sub-system having a memory management system according to the invention is a node element module of a node. A typical node in a network typically comprises node element modules for performing functions, examples of which are payload traffic-carrying functions or maintenance functions. In one embodiment, the node element module comprises an optical element, and the optical element is connected with electronic hardware and/or software for controlling or monitoring the optical element.

A node element module is typically located on a circuit pack or circuit card, a certain number of which exist in a shelf unit. There may be one or more shelf units that comprise the hardware and software of the node. The number and arrangement of circuit packs in a shelf unit require planning to provide for, among other things, all necessary connections, heat dissipation, and power consumption. The circuit packs may be communicatively coupled to one another through a backplane.

The transport complex 110 includes node element modules 112, 114, 116. The transport complex comprises a collection of node element modules in the system that perform traffic-carrying functions with respect to the optical communications traffic. For example, these modules of the transport complex process the payload data of the product. For a transport complex in a node providing optical processing, the node element modules may comprise optical filters, switches, amplifiers, attenuators, transmitters and receivers.

The administrative complex 102 is primarily concerned with management of the node and system related management functions. The administrative complex typically has no payload traffic-carrying elements. The administrative complex performs administrative node functions. Examples of administrative node functions are node configuration, provisioning, providing a management interface to the customer, retrieving and indicating failure conditions through alarms. In other words, the administrative complex performs functions related to the operation, administration, maintenance, and provisioning (OAM&P) of the node. Another administrative function is interaction with external customer management systems to transmit the system's status and accept configuration commands. Other functions include reading external event inputs and signaling exception conditions on alarm outputs.

The processor module 106 also has an intra-nodal communication link 128A to another node element module, the primary signaling channel module 120A and another intra-nodal communication link 128B to a back-up signaling channel module 120B. The persistent storage module 104 also has an intra-nodal communication link 126A to the primary signaling channel module 120A and another intra-nodal communication link 126B to the back-up signaling channel module 120B. Each of the node element modules in the transport complex has a communication link 130A, 132A, 134A to the primary signaling channel module 120A. Each node element module on the transport complex is also communicatively coupled via a communication link 130B, 132B, 134B to the back-up signaling channel module 120B.

Figure 3:
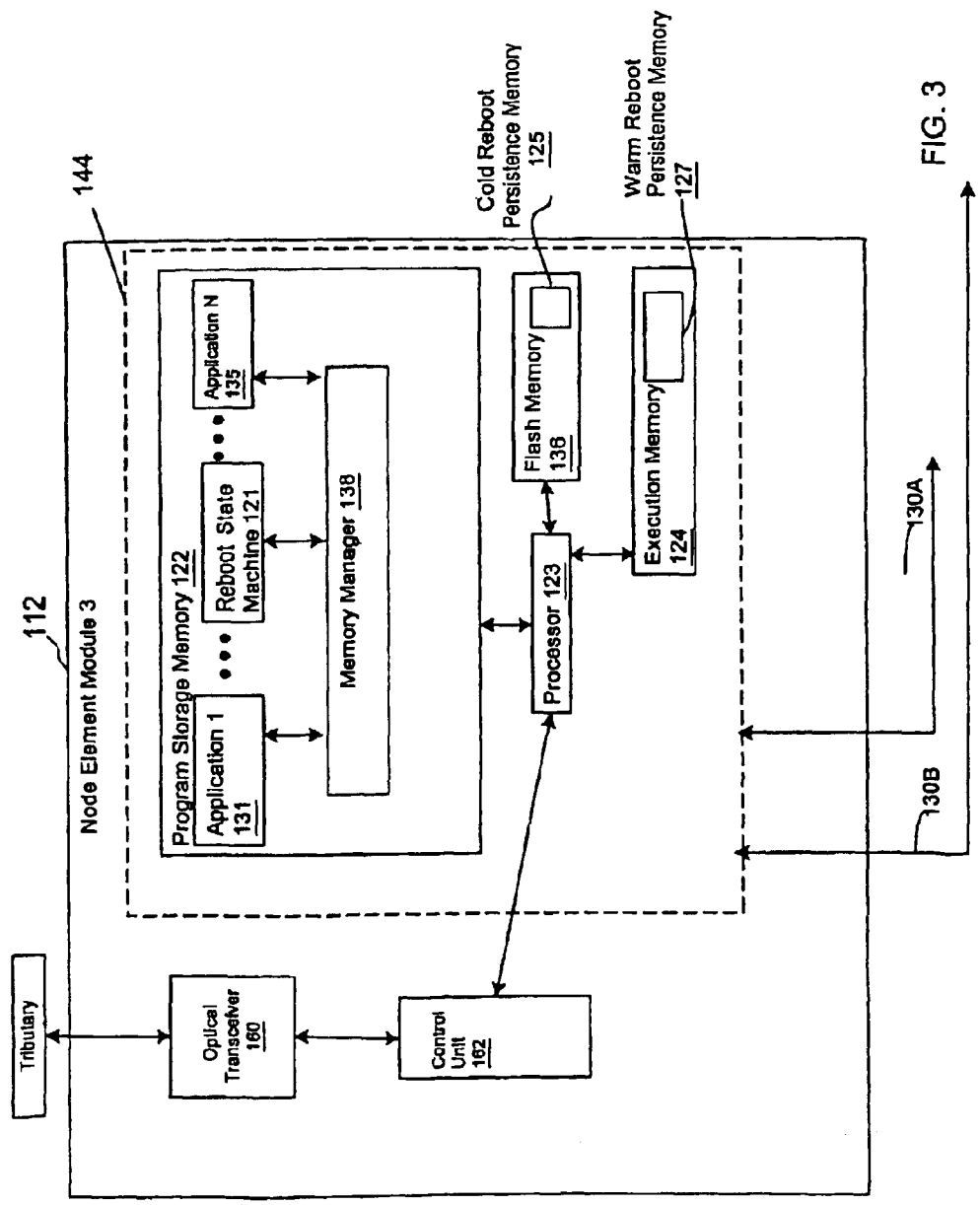
FIG. 3 illustrates an embodiment of a node element module in an optical node in an optical communications network in accordance with the present invention.

FIG. 3 illustrates an embodiment of a node element module in an optical node in an optical communications network in accordance with the present invention. Node element module 112 comprises an optical transceiver 160, a control unit 162 for the transceiver, a control sub-system 144, and a communication link 130A from the control sub-system to the primary signaling channel module and a communication link 130B from the control sub-system to the back-up signaling channel module. The optical transceiver comprises an optical transmitter such as a laser, and an optical receiver. This embodiment of a node element module also has the control unit 162 including electrical hardware and software as control logic for controlling the transmitter and receiver. For example, the control unit for a laser typically comprises a driver circuit for controlling the output of the laser.

In this embodiment, the control subsystem 144 comprises an architecture, which includes a processor 123, program storage memory 122, execution memory 124, and flash memory 136. The control subsystem 144 may be augmented with additional input/output (I/O) and control capabilities, as appropriate.

The program storage memory comprises executable software applications 131, 135 including a reboot state machine application 121 and a memory manager application 138. The applications are executed by the processor 123 which is communicatively coupled to access the program storage memory 122, flash memory 136, and execution memory 124. The processor 123 is also communicatively coupled to the control unit 162 associated with the optical node element 160. In the embodiment shown, the flash memory 136 comprises non-volatile cold-reboot persistence memory 125. The execution memory 124 comprises a warm-reboot persistence memory which may be embodied as random access memory (RAM) 127. In the embodiment of FIG. 3, the operating system (not shown does not clear the contents of the persistence memory during a reboot.

Figure 4A:
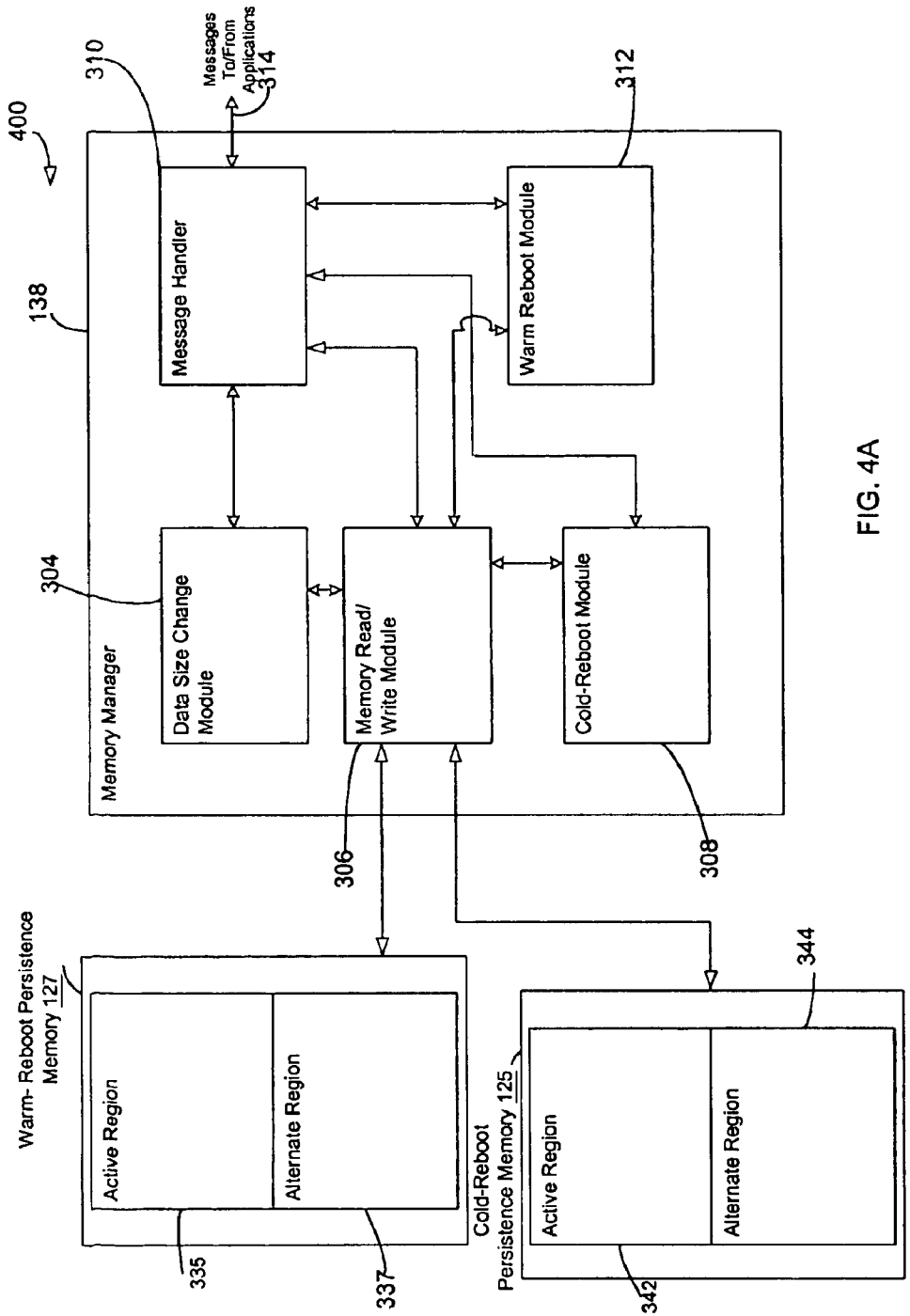
FIG. 4A illustrates an embodiment of a memory system in accordance with the present invention.

FIG. 4A illustrates an embodiment of a memory system 400 in accordance with the present invention. The system 400 comprises a memory manager 138, a warm-reboot persistence memory 127, and a cold-reboot persistence memory 125. The warm-reboot persistence memory 127 stores sets of data that must persist over warm-reboots. The warm-reboot persistence memory 127 may be embodied in random access memory (RAM). The non-volatile cold-reboot persistence memory 125, such as may be embodied in Flash memory, stores sets of data that must persist over cold-reboots. In the example shown, the warm-reboot persistence memory 127 includes a first memory region 335 marked or designated active and a second memory region 337 marked or designated alternate. The cold-reboot persistence memory 125 also comprises a first memory region 342 marked or designated active and a second memory region 344 marked or designated alternate. In one embodiment, the designation or marking of a region may be changed from active to alternate and vice versa responsive to events.

The memory manager 138 comprises a message handler 310 communicatively coupled via a communications link 314 to receive and send messages to software applications. In this embodiment, the memory manager 138 is a message based manager that directly controls access to the memory for persistent storage of a set of data from an application. The manager may be analogized to a proxy manager that prevents the applications from directly storing data to the memory. For example, the memory manager 138 provides an interface where an application can send a request to store data. When the memory manager 138 receives such a request, it allocates the necessary memory from reboot persistence memory, if not done previously, and stores the data. In this example, the memory manager 138 is the only thread that has access to reboot persistence memory 125, 127 regions, so no semaphore protection is needed to make access to the reboot memory 125, 127 thread/task safe.

In one embodiment, a message 314 received by the message handler 310 includes a set of data to be stored, a reboot state indicator, and an application identifier for the set of data. The message 314 may also include a data size indicator for the set of data. The reboot state indicator may include one or more data items indicating whether the set of data is to be sent during a warm-reboot or a cold-reboot. For example, the reboot state indicator may include a warm-reboot persistency or a cold-reboot persistency indicator for the set of data. Furthermore, in another example, the reboot state indicator may indicate a particular state of a warm-reboot or a particular state of a cold-reboot during which the set of data is to be stored. The application identifier may include an object identifier to identify the object in the application in the context of a current thread with which the set of data is associated. In one embodiment, the application identifier includes an endpoint identification including card identifying information such as a a shelf number and slot number for identifying the card that is a destination for the set of data. Additionally, the application identifier may also include a data key. The data key is a unique identifier specified by the application. If an application stores more than one set of data, the data key may be used to distinguish one set from the other.

The message handler 310 is communicatively coupled to the memory read/write module 306 which in turn is communicatively coupled to the warm-reboot persistence memory 127 and the cold-reboot persistence memory 125. The memory manager 138 further comprises a warm-reboot module 312, a cold-reboot module 308 and a data size change module 304. The warm-reboot module 312 controls the retrieval of data requested by applications during a state of a warm-reboot. The cold-reboot module 308 controls the retrieval of data requested by applications during a state of a cold-reboot. The cold-reboot module also processes a message from an application indicating that data for the application is to be committed to cold-reboot persistence memory. For example, the application may indicate that the data is to be committed to the cold-reboot memory by including in a message an indicator for committing the set of data to cold-reboot persistence memory.

Those of ordinary skill in the art recognize that the systems and methods of the invention may be embodied in software and/or hardware embodied within one or more computer usable media. An example of a computer usable medium is a memory. For example, the memory manager 138 may be software embodied in program storage memory 122. Furthermore, it will be understood by those of skill in the art that the various embodiments of the systems and methods of the invention may be implemented in hardware, software, firmware or any combination of these. Additionally, those skilled in the art will appreciate that although the modules are depicted as individual units, the functionality of the modules may be implemented in a single unit (e.g. a single software program) or any combination of units.

FIG. 4B illustrates an embodiment of a warm-reboot persistence memory 127 as random access memory 127 (RAM). In the embodiment shown, the RAM includes the active region 335, having an active region header 414 and active region data portion 404, and the alternate region 337 having an alternate region header 416 and an alternate region data portion 410. In this embodiment, the content of the alternate region 337 is illustrated as a mirror image of the content of the active region 335.

Each of the active data portion 404 and the alternate data portion 410 further comprise one or more sets 402, 406, 408, 412 of data. In this embodiment, each set of data has a data header 436, 440, 444, 448 and a data portion 438, 442, 446, 450. In one embodiment, the data header 436 will store the application identifier, including an endpoint identifier (ID), object ID and data key, as well as data size and the reboot state indicator for its respective set of data.

FIG. 4C illustrates an embodiment of a non-volatile cold-reboot persistence memory 125. In the embodiment shown, the cold-reboot persistence memory 125 includes the active region 342, having an active region header 418 and active region data portion 422, and an alternate region 344 having an alternate region header 428 and an alternate region data portion 432. In this embodiment, the content of the alternate region 344 is illustrated as a mirror image of the content of the active region 342.

Each of the active data portion 422 and the alternate data portion 432 further comprise one or more sets 420, 424, 430, 434 of data. In this embodiment, each set of data has a data header 452, 456, 460, 464 and a data portion 454, 458, 462, 466. In one embodiment, the data header 452 will store the application identifier, data size and the reboot state indicator for its respective set of data.

Although FIGS. 4A, 4B and 4C depict the warm-reboot persistence memory and the cold-reboot persistence memory as separate memories, one non-volatile form of memory could be used as both warm and cold-reboot persistence memory. For example, static RAM with battery back-up or static RAM that saves to an EEPROM are examples of memory that may be used for preserving data across both cold and warm-reboots.

Figure 5:
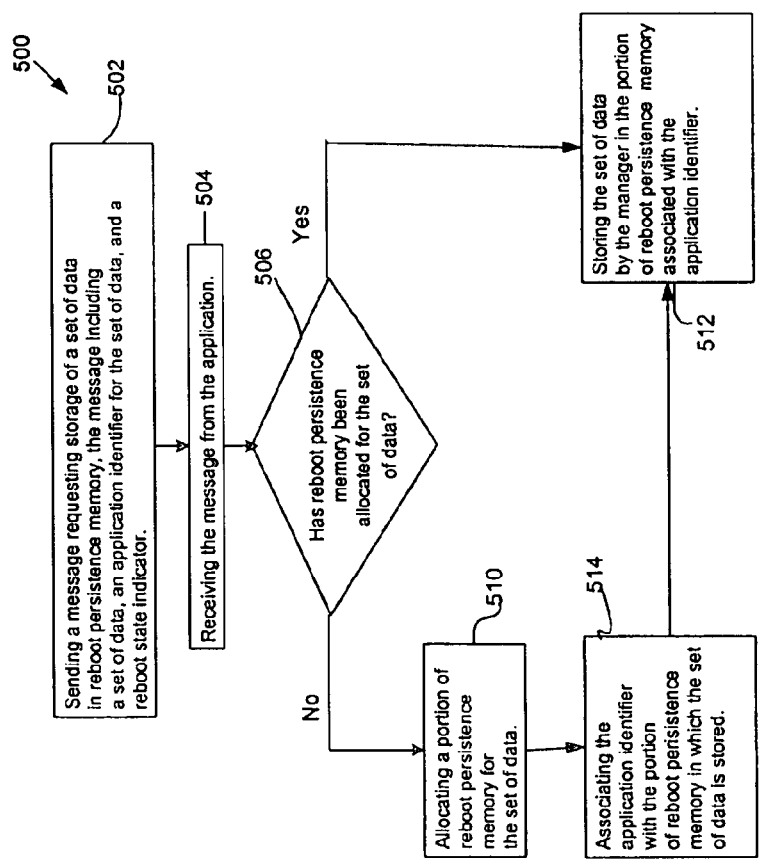
FIG. 5 illustrates an embodiment of an overall method of storage of data by a memory manager in accordance with the present invention.

FIG. 5 illustrates an embodiment of an overall method 500 of storage of data by a memory manager in accordance with the present invention. A system such as the embodiment shown in FIG. 4A may perform the embodiment of the method illustrated in FIG. 5. For purposes of discussion, the method of FIG. 5 will be discussed in terms of the embodiments of FIGS. 4A, 4B and 4C. An application determines which set of data is a set of data that is to be saved over either a warm-reboot or a cold reboot. An application sends, in step 502, a message to the memory manager application 138. The message 314 requests storage of a set of data in reboot persistence memory. The message in this embodiment includes a set of data to be stored in memory, an application identifier for the set of data, and reboot state indicator. The message handler 310 of the memory manager 138 receives (in step 504) the message 314 from the application. The set of data and the application identifier are sent to the memory read/write module 306. The memory read/write module 306 determines (in step 506) whether reboot persistence memory has been allocated for the set of data. Responsive to memory not having been allocated, a portion the region of reboot persistence memory is allocated (in step 510) for the set of data. An example of a portion of the region would be a block of memory. The memory manager 138 associates (in step 514) the application identifier with the portion of reboot persistence memory in which the set of data is stored. Responsive to memory having been allocated, the set of data is stored (in step 512) in the portion of reboot persistence memory associated with the application identifier.

Figure 12:
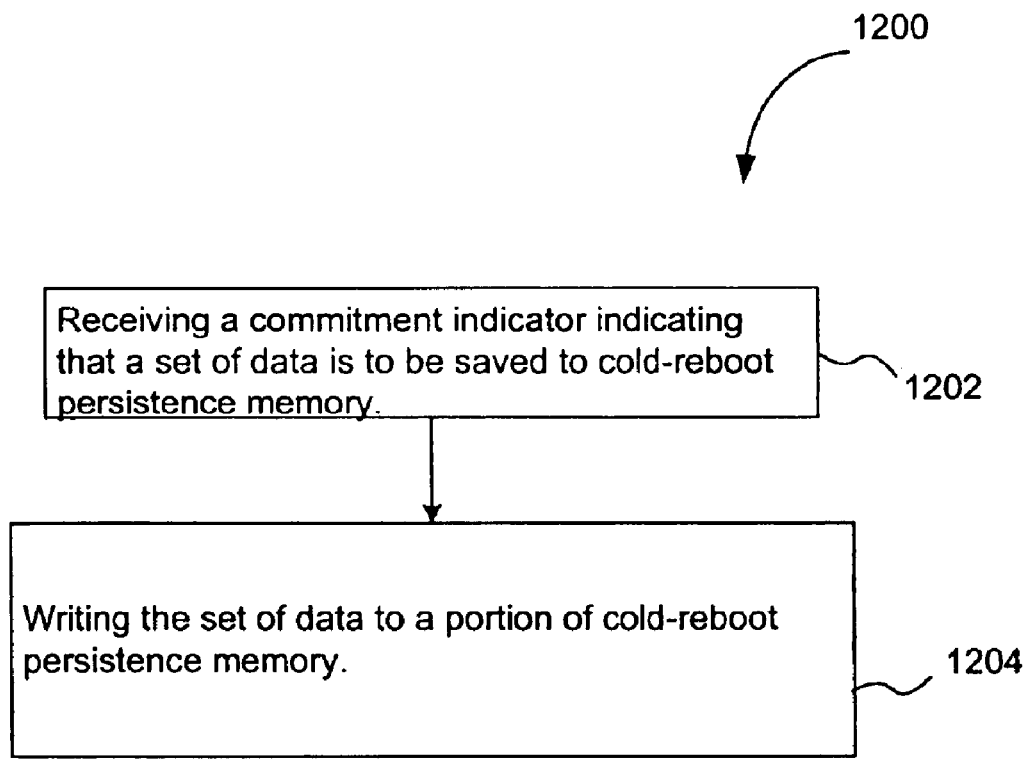
FIG. 12 illustrates an embodiment of storage of data in cold-reboot persistence memory by a memory manager in accordance with the present invention.

FIG. 12 illustrates an embodiment of a method 1200 of storage of data in cold-reboot persistence memory by a memory manager in accordance with the present invention. A system such as the embodiment shown in FIG. 4A may perform the embodiment of the method illustrated in FIG. 12. For purposes of discussion, the method of FIG. 12 will be discussed in terms of the embodiment of FIG. 4A. Responsive to receiving 1202 a commitment indicator indicating that one of the sets of data is to be saved to the cold-reboot persistence memory, in the embodiment of FIG. 4A, the cold-reboot module 308 of the memory manager 138 causes the memory read/write module 306 to write 1204 the set of data to a portion of cold-reboot persistence memory.

Figure 6:
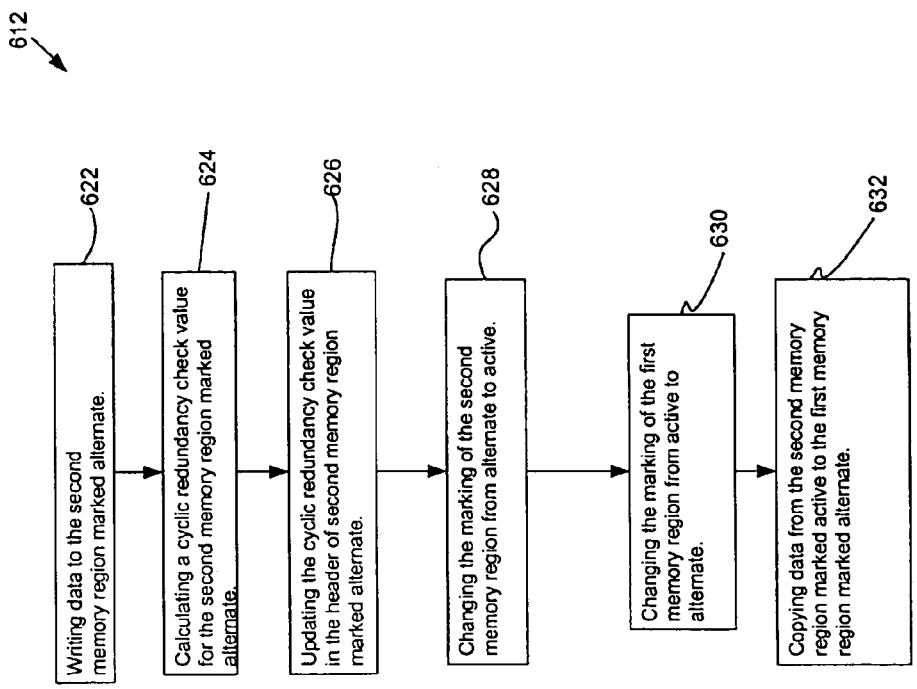
FIG. 6 illustrates an embodiment of a method for determining the validity of the data being stored in the reboot persistence memory in accordance with the present invention.

FIG. 6 illustrates an embodiment of a method 612 for determining the validity of the application data being stored in a reboot persistence memory. A system such as the embodiment shown in FIG. 4A may perform the embodiment of the method illustrated in FIG. 6. For purposes of discussion, the method of FIG. 6 will be discussed in terms of the embodiment of FIG. 4A. As shown in the embodiment of FIGS. 4B and 4C, the active and alternate regions are mirror images of each other. The designations or markings as alternate and active can be changed. In one embodiment, the marking for the region is stored in the region's header. The memory read/write module 306 writes 622 the data to the second memory region 337, 344 marked alternate. The memory module calculates 624 a cyclic redundancy check value for the second memory region marked alternate. A cyclic redundancy check value may be used to test the integrity of the data. The cyclic redundancy check value in the header 416, 428 of the second memory region 337, 344 marked alternate is updated 626. The marking of the second memory region 337, 344 is changed 628 from alternate to active. The marking of the first memory region 335, 342 is changed 630 from active to alternate. The data is copied 632 from the second memory region 337, 344 now marked active to the first memory region 335, 342 now marked alternate.

Figure 7A:
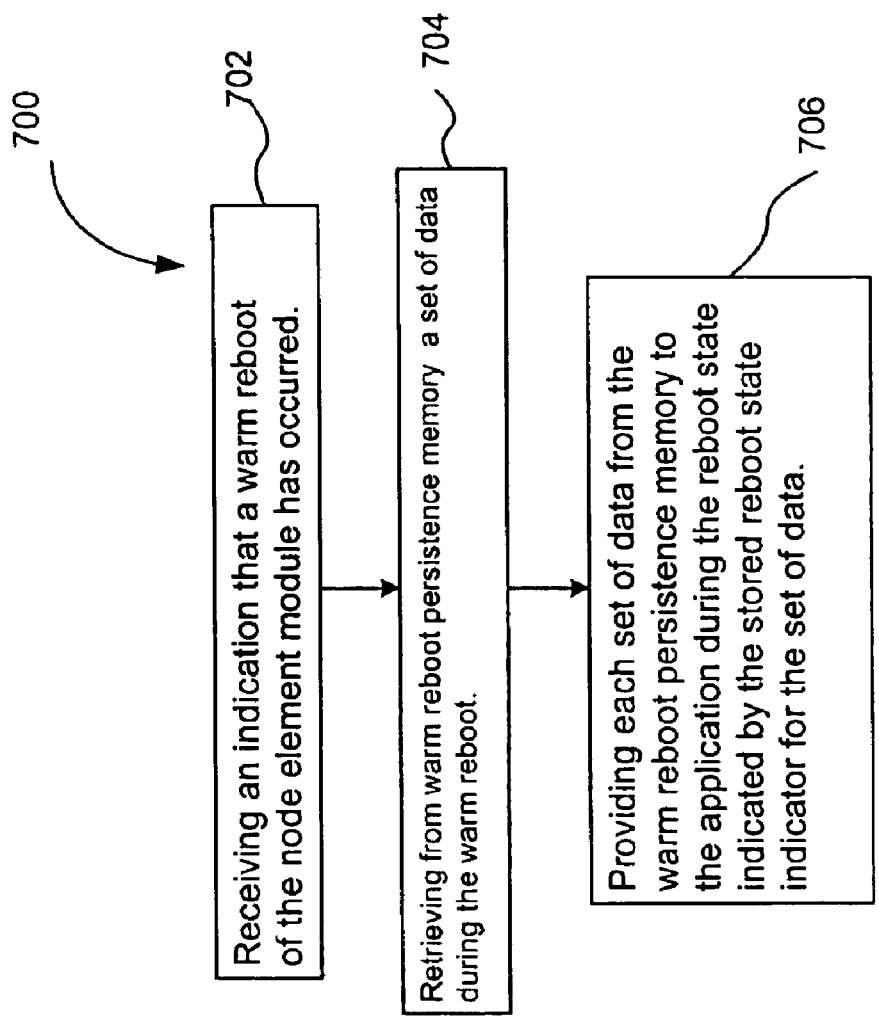
FIG. 7A illustrates an embodiment of a method for providing application data from warm-reboot persistence memory to the application during a warm-reboot of a circuit card in accordance with the present invention.

FIG. 7A illustrates an embodiment of a method 700 for providing application data from warm-reboot persistence memory to the application during a warm-reboot of a circuit card such as the embodiment node of an element module.

The embodiment of a method illustrated in FIG. 7A may be performed by a system such as the embodiment of FIG. 4A. For purposes of discussion, the method of FIG. 7A will be discussed in terms of the embodiments of FIGS. 3 and 4A. Referring back to FIG. 3, the embodiment of the node element module includes a reboot state machine application 121. In this embodiment, the reboot state machine application sends messages to the memory manager 138 to indicate that a warm-reboot has occurred and the current state of the warm-reboot. Examples of states of either a warm-reboot or a cold-reboot are an initialization state, an unprovisioned state, a provisioning state, a pre-running state or a running state. The message handler 310 receives 702 the indication in a message that a warm-reboot of the node element module has occurred. The indication in this example also includes a state of the reboot, for example the initialization state. In the context of FIG. 4A, the message handler 310 of the memory manager receives subsequent indications of transitions between states of the warm-reboot of the node element module. Under the control of the warm-reboot module 312, the memory read/write module 306 cycles through the warm-reboot persistence memory 127 and retrieves 704 the one or more sets of data indicated to be sent to an application during a particular state during the warm-reboot. The memory manager 138 provides 706 each set of data from the warm-reboot persistence memory to the application during the state indicated by the stored reboot state indicator for the set of data. In this way, the application does not have to send a message during the reboot state in order to retrieve its data. The data is sent by the memory manager 138 automatically. In one embodiment, a message including the set of data is sent during the previously indicated reboot state to the application. In another embodiment, in which the set of data is particularly large, the message to the application may include a pointer to a memory location from which the data may be read.

Figure 7B:
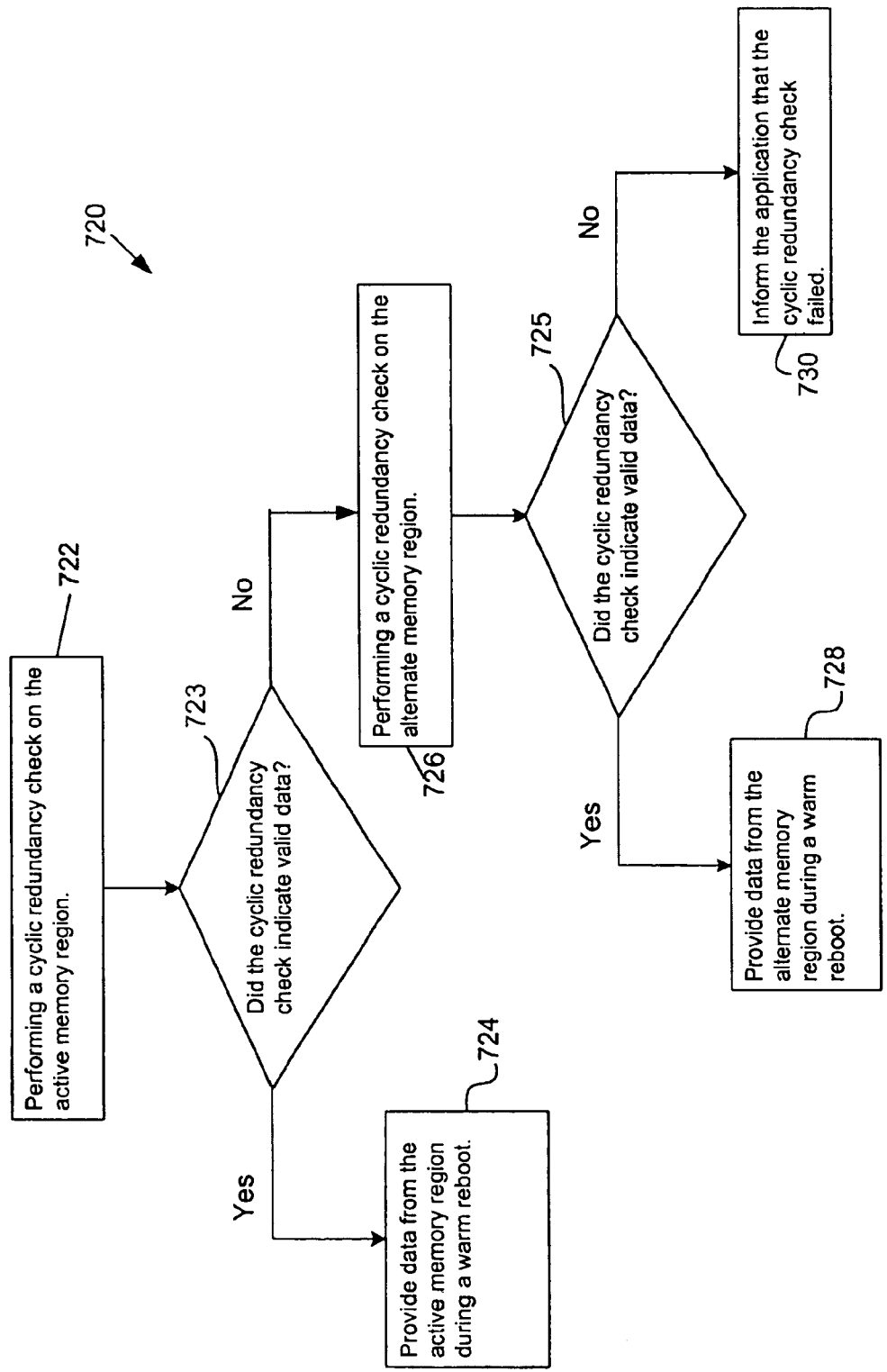
FIG. 7B illustrates an embodiment of a method for determining validity of the application data being retrieved from memory during a warm-reboot in accordance with the present invention.

FIG. 7B illustrates an embodiment of a method 720 for determining validity of the application data being retrieved from memory during a warm-reboot. A system such as the embodiment shown in FIG. 4A may perform the embodiment of the method illustrated in FIG. 7B. For purposes of discussion, the method of FIG. 7B will be discussed in terms of the embodiment of FIG. 4A. Responsive to a warm-reboot of the node element module, the memory manager 138 performs 722 an integrity test, such as a cyclic redundancy check, for the region 335 marked active of the warm-reboot persistence memory. A determination is made 723 whether the integrity test indicated valid data. Responsive to a successful integrity test result for the active region 335 indicating valid data, each set of data is provided 724 from the active region to the application indicated, in its respective application identifier during the warm-reboot as indicated in the reboot state indicator stored for the set. The reboot state indicator may indicate simply either a warm or cold-reboot or a particular state of either kind of reboot. Because the application identifier and reboot state indicator have been stored prior to the warm-reboot for the set of data, it is not necessary for the application to request the data during the reboot.

Responsive to an unsuccessful integrity test result for the active region 337, an integrity test for the memory region 337 marked alternate is performed 726. A determination is made 725 whether the integrity test indicated valid data. Responsive to a successful integrity test result indicating valid data for the alternate region 337, each set of data is provided 728 from the alternate region 337 to the application indicated in its respective stored application identifier during the warm-reboot as indicated in the reboot state indicator for the set. Responsive to an unsuccessful integrity test result for the alternate region 337, the application is informed 730 that the cyclic redundancy check failed.

Figure 8A:
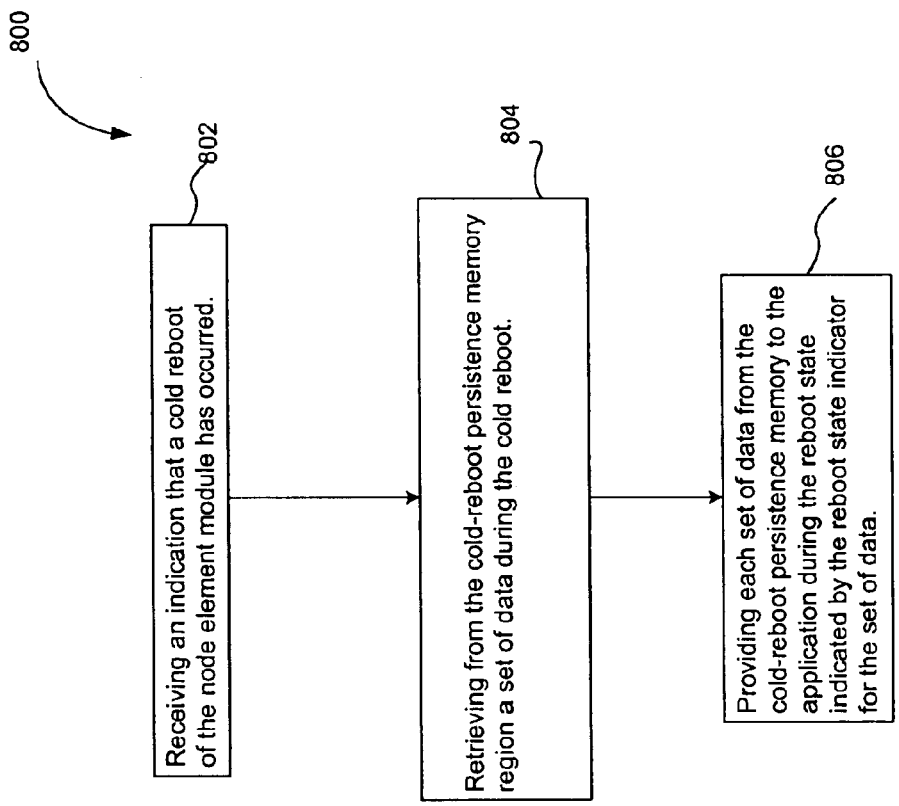
FIG. 8A illustrates an embodiment of a method for providing application data from non-volatile memory to the application during a cold-reboot of the circuit card in accordance with the present invention.

FIG. 8A illustrates an embodiment of a method for providing application data from non-volatile memory to the application during a cold-reboot of a circuit card such as the embodiment of a node element module illustrated in FIG. 3. The embodiment of a method illustrated in FIG. 8A may be performed by a system such as the embodiment of FIG. 4A. For purposes of discussion, the method of FIG. 8A will be discussed in terms of the embodiment of FIG. 4A. The message handler 310 of memory manager 138 receives 802 an indication, such as in a message, that cold-reboot of the node element module has occurred. The indication in this example also includes a state of the reboot, for example the initialization state. The message handler 310 receives subsequent indications of transitions between states of the cold-reboot of the node element module. Under the control of the cold-reboot module 308, the memory read/write module 306 cycles through the non-volatile cold-reboot persistence memory 125 and retrieves 804 the one or more sets of data indicated previously, such as by the stored reboot state indicator for each set, to be sent to an application during a particular state during the cold-reboot. The memory manager 138 provides 806 each set of data from the cold-reboot persistence memory to the application during the state indicated by the stored reboot state indicator for the set of data. In this way, the application does not have to send a message during the reboot state in order to retrieve its data. The data is sent by the memory manager 138 automatically. In the example of FIG. 2, if each node element module has its own associated cold-reboot persistence storage memory associated with it, each node element module can store its own configuration information to be saved over a cold-reboot. This further decreases messaging with other modules such as the administrative node processor module 106 of the administrative complex 102 resulting in decreased reboot time. In one embodiment, a message including the set of data is sent during the previously indicated reboot state to the application. In another embodiment, in which the set of data is particularly large, the message to the application may include a pointer to a memory location from which the data may be read.

Figure 8B:
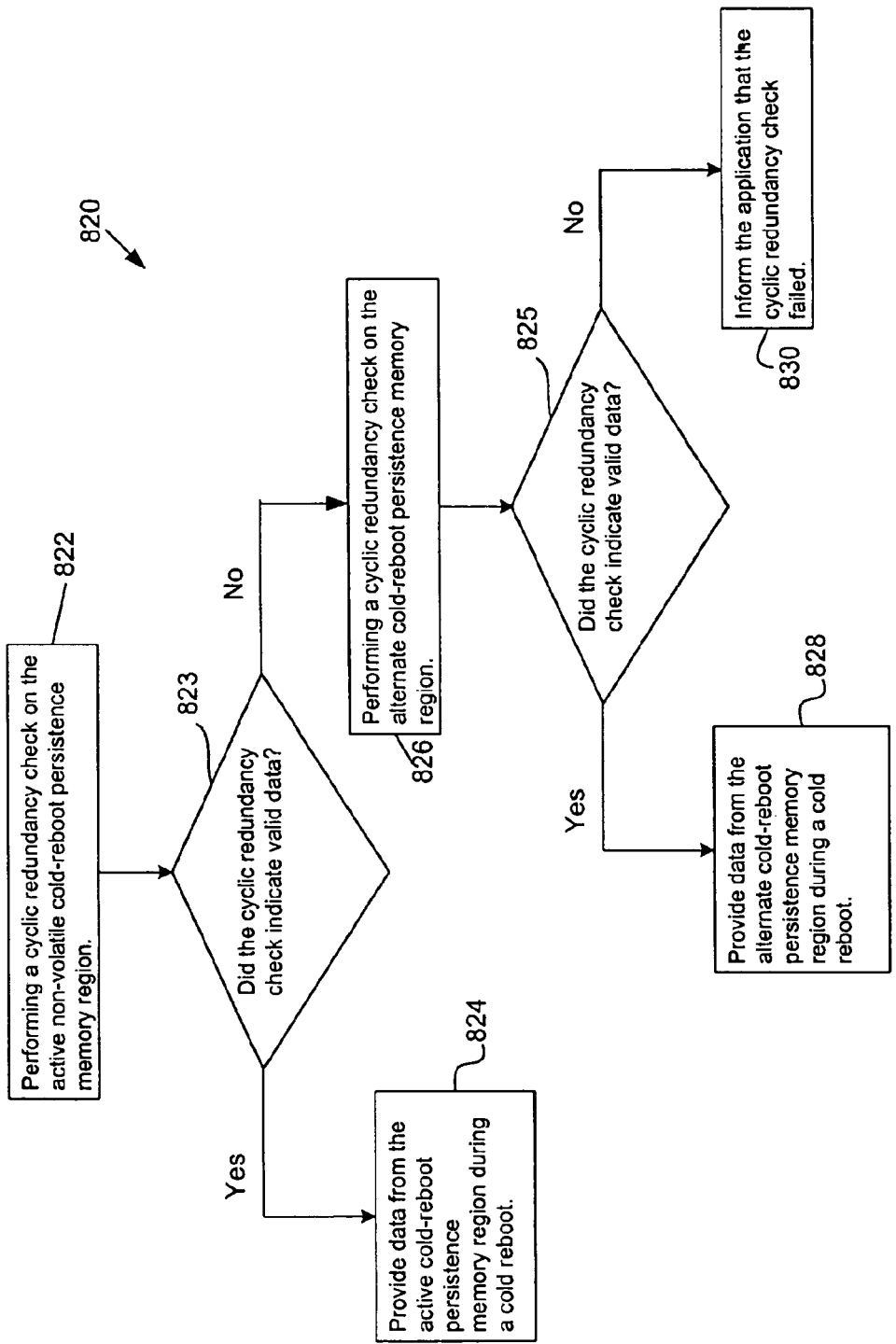
FIG. 8B illustrates an embodiment of a method for determining validity of the application data being retrieved from non-volatile memory during a cold-reboot in accordance with the present invention.

FIG. 8B illustrates an embodiment of a method 820 for determining validity of the application data being retrieved from cold-reboot persistence memory during a cold-reboot. A system such as the embodiment shown in FIG. 4A may perform the embodiment of the method illustrated in FIG. 8B. For purposes of discussion, the method of FIG. 8B will be discussed in terms of the embodiment of FIG. 4A. Responsive to a cold-reboot of the node element module, the memory manager 138 performs 822 an integrity test, such as a cyclic redundancy check, for the active region 342 marked in the non-volatile cold-reboot persistence memory region. A determination is made 823 whether the integrity test indicated valid data. Responsive to a successful integrity test result indicating valid data for the active region, each set of data is provided 824 from the active region to the application indicated, in its respective application identifier during the cold-reboot as indicated in the reboot state indicator for the set. The reboot state indicator may indicate simply either a warm or cold-reboot or a particular state of either kind of reboot. Because the application identifier and reboot state indicator have been stored prior to the cold-reboot for the set of data, it is not necessary for the application to request the data during the reboot.

Responsive to an unsuccessful integrity test result for the active region 342, an integrity test for the cold-reboot persistence memory region marked 314 alternate is performed 826. A determination 825 is made whether the integrity test indicated valid data. Responsive to a successful integrity test result indicating valid data for the alternate region 344, each set of data is provided 828 from the alternate region to the application indicated in its respective stored application identifier during the cold-reboot as indicated in the reboot state indicator for the set. Responsive to an unsuccessful integrity test result for the alternate region 344, the application is informed 830 that the cyclic redundancy check failed.

In the embodiment in which the warm-reboot and cold-reboot memories are embodied in one non-volatile memory area, the methods illustrated in FIGS. 7A and 7B would be performed as would the methods illustrated in FIGS. 8A and 8B. For example, during a warm-reboot, only a data set whose reboot state indicator indicates that it is to be sent to an application during a warm-reboot will be sent during the indicated state. A data set indicating that it only be sent during a cold-reboot will not be sent to its associated application during the warm-reboot.

Applications may also send retrieval requests at any time to the memory manager 138 to retrieve data from reboot persistence memory, whether it be random access memory or non-volatile memory.

As discussed above, a node element module may be embodied as a circuit pack or a circuit card. Often for a certain functionality, there is a primary node element module circuit card and a back-up node element module circuit card.

Figure 9A:
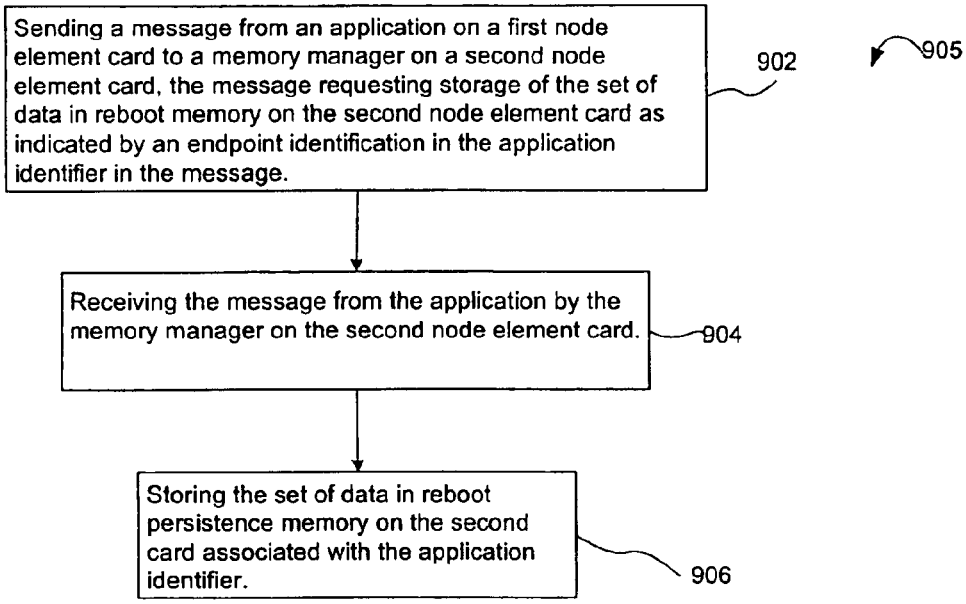
FIG. 9A illustrates an embodiment of an overall method of storing application data across card boundaries in reboot persistence memory in accordance with the present invention.
Figure 9B:
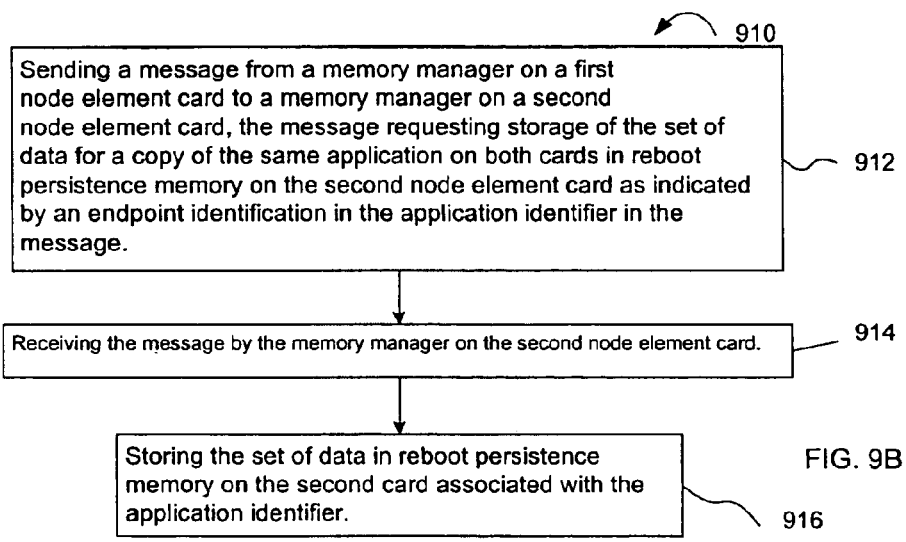
FIG. 9B illustrates another embodiment of an overall method of storing application data across card boundaries in reboot persistence memory in accordance with the present invention.

FIG. 9A illustrates an embodiment of an overall method of storing application data across card boundaries in reboot persistence memory. FIG. 9B illustrates another embodiment of an overall method of storing application data across card boundaries in reboot persistence memory.

Figure 10:
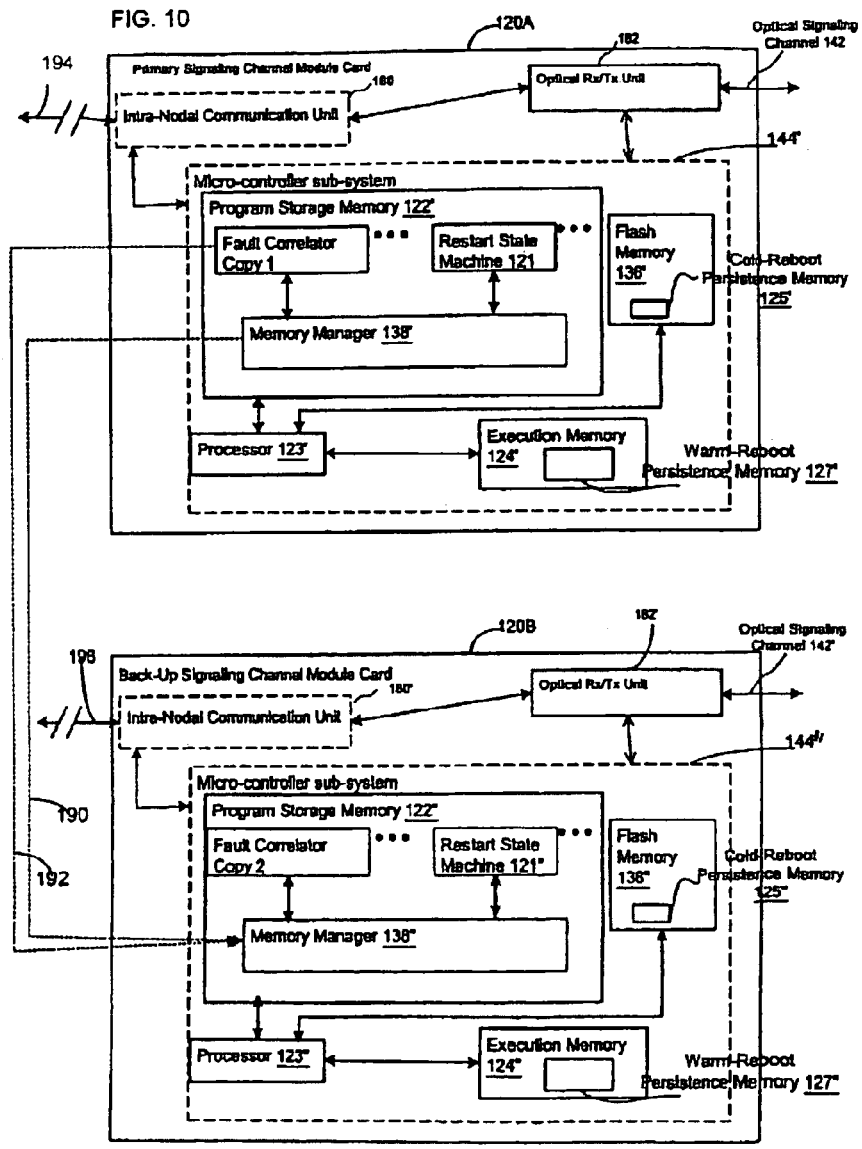
FIG. 10 illustrates an embodiment of a system for storing application data from a first node element module card to reboot persistence memory in a second node element module card in accordance with the present invention.

FIG. 10 illustrates an embodiment of a system for storing application data from a first node element module card to reboot persistence memory in a second node element module card in accordance with the present invention. In this example, there are two node element modules embodied on separate cards, a primary signaling channeling module card 120A having a copy of an application, Fault Correlator Copy 1, and a back-up signaling channel module card 120B having another copy of the same application, Fault Correlator Copy 2. The embodiments of the methods of FIGS. 9A and 9B may be performed by a system of node element cards such as those illustrated in FIG. 10. For discussion purposes, the methods of FIGS. 9A and 9B will be discussed in the context of FIG. 10.

Each embodiment of a signaling channel module card in FIG. 10 comprises an optical transceiver unit 182, 182', an intra-nodal communication unit 180, 180', and a control subsystem 144', 144". The optical transceiver unit comprises an optical transmitter such as a laser, an optical receiver and related control logic for the transmitter and receiver. The optical transceiver unit 182, 182' receives and transmits an optical signaling channel for the transfer of maintenance or supervisory information between a node and one or more other nodes in the optical network.

In the embodiments of FIGS. 1A and 1B, the optical signaling channel travels a path including one or more optical transmission media between the nodes. An optical signaling channel may be embodied in several different ways. For example, the channel may be embodied as one or more dedicated wavelengths received by the signaling channel module. The signaling channel may be embodied in one or more divisions of a time-division multiplexed signal. In another embodiment, the signaling channel is modulated onto the payload signals.

The intra-nodal communication unit 180, 180' provides a central connection point for intra-nodal communication between node element modules including the primary and back-up signaling channel modules. In one embodiment, the intra-nodal communication unit 180, 180' comprises an Ethernet Switch. In another embodiment, the intra-nodal communication unit 180, 180' comprises a bus and bus control logic.

In the embodiment shown, the control sub-system 144', 144" comprises an architecture similar to that of the node element module embodiment depicted in FIG. 3. The processor 123', 123" of the control sub-system executes instructions to perform the functions of the signaling channel module. An example of such a function is control of the transfer of information between a node and other nodes of the network over the optical signaling channel. The other node element modules, such as those illustrated in FIG. 2, are communicatively coupled to the intra-nodal communication unit 180, 180' via a communication link 194, 196. Due to the pivotal communication role of the signaling channel module, a node may typically have both a primary signaling channel module 120A card and a back-up signaling channel module card 120B.

In the embodiment of the method of FIG. 9A for storing application data across card boundaries in reboot persistent memory, an application on a first node element card, in this example, fault correlator copy 1 on the primary signaling channel module 120A, sends 902 a message (see FIG. 10, 192 for illustrative purposes of an information flow) to the memory manager on the second node element card, in this example the memory manager 138" on the back-up signaling channel module 120B. The message requests storage of a set of data in memory 127", 125". In one embodiment, the endpoint identification in the application identifier of the message includes card identifying information including the shelf number and slot number for the second card so that the message including data is forwarded to the second card where it is associated in memory with the same application on the second card.

In the context of FIG. 10, the message from fault correlator copy 1 is forwarded by the processor 123' to the intra-nodal communication unit 180 and transferred through a communication link 194 to the intra-nodal communication unit 180' of the back-up card where the processor 123" of the back-up card forwards it to the message handler (see 310, FIG. 4A) of the memory manager 138" of the back-up card. The memory manager 138" receives 904 the message from fault correlator copy 1 (step 909, FIG. 9) and stores 906 the set of data in the reboot persistence memory (127" or 125") located on the back-up signaling channel module card 120B as indicated by the reboot state indicator for the set. The manager 138" associates the set of data with the copy of the application (e.g. fault correlator copy 2) located on the second card. The fault correlator copy 1 will also typically request storage of the set of data to the memory manager 138' on its own card for storage.

In the embodiment of FIG. 9B, the memory manager 138' of the first card, the primary signaling channel module card, sends 910 a message (see FIG. 10, 190 for illustrative purposes of an information flow) to the memory manager 138" on the second node element card, back-up signaling channel module card 120B. The message requests storage of a set of data in a reboot memory (127" or 125") on the second card. The memory manager 138" receives 914 the message from fault correlator copy 1 and stores 916 the set of data in the persistence memory, either random access memory 127" or cold-reboot persistence memory 125" located on the back-up signaling channel module card 120B in accordance with the reboot state indicator. The manager 138" stores the set of data on the second card in memory associated with the application identifier. In this way, the set of data is associated with the copy of the application (e.g. fault correlator copy 2) located on the second card.

Figure 11:
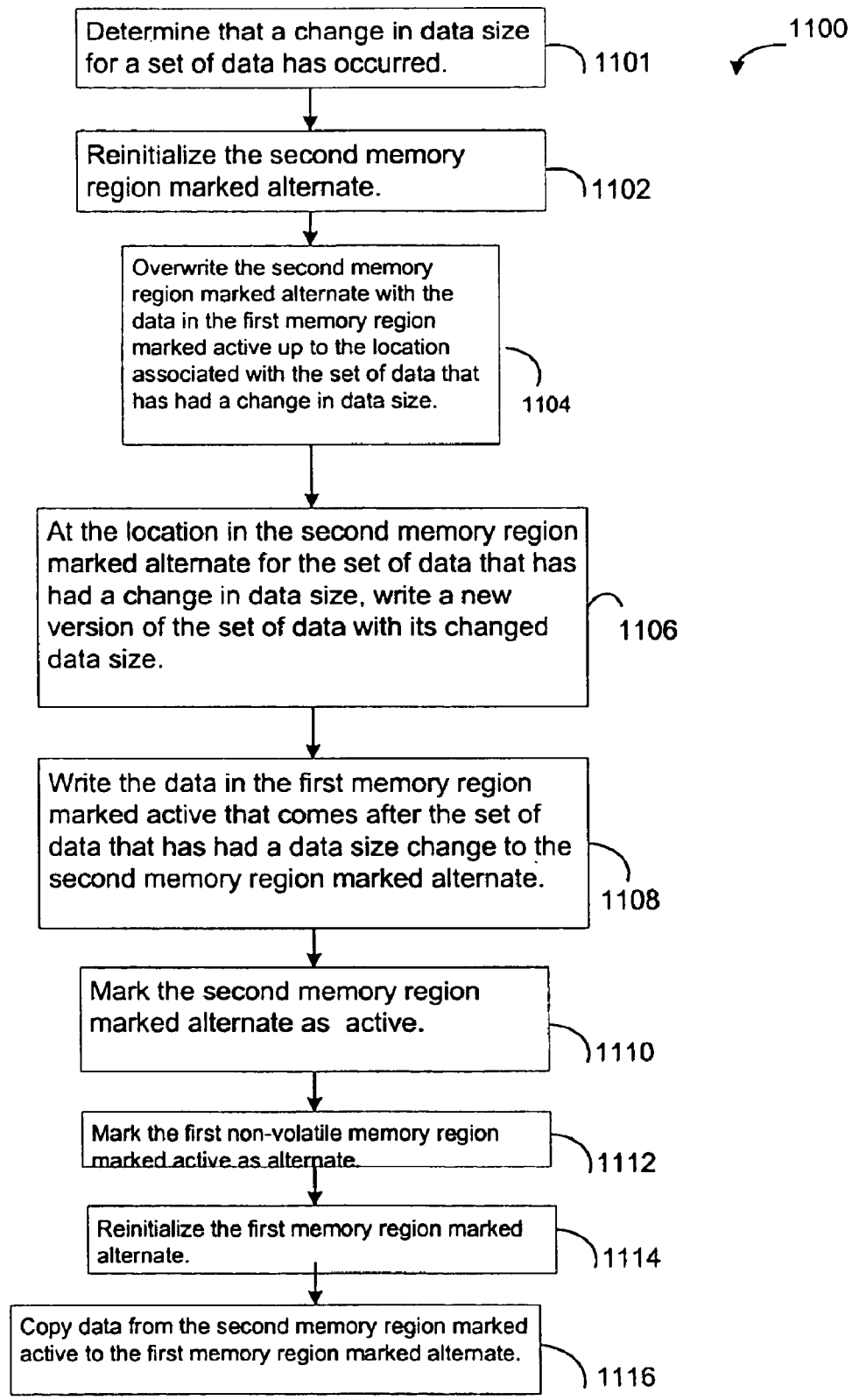
FIG. 11 illustrates an embodiment of a method for adjusting for a new version of a set of data in memory in accordance with the present invention.

FIG. 11 illustrates an embodiment of a method 1100 for adjusting for a new version of a set of data in reboot memory. A new version often results in a data size change in the set of data. A system such as the embodiment shown in FIG. 4A may be used to implement the embodiment of the method of FIG. 11. The method of FIG. 11 will be discussed on the context of FIG. 4A for illustrative purposes. The message handler 310 determines 1101 that a change in data size for a set of data has occurred. For example, the message may include a data size indicator indicating the amount of data to be stored, and the message handler compares the data size indicated with that previously stored for this set of data. The data size change module 304 may reinitialize 1102 the second memory region 337, 344 marked alternate to clear the current region. The data size change module 304 instructs the memory read/write module 306 to overwrite 1104 the second memory region 337, 344 marked alternate with the data in the first memory region 335, 342 marked active up to the location associated with the set of data that has had a change in data size. Under the control of the data size change module 304, the memory read/write module 306, at the location in the second memory region marked alternate for this set of data with its changed data size writes 1106 a new version of this set of data with its changed data size. Then the data in the first memory region 335, 342 marked active that comes after the set of data that has had a data size change is written 1108 to the second memory region 337, 344 marked alternate. The data size change module causes the second memory region 337, 344 marked alternate to be marked 1110 as active. The first memory region 335, 342 marked active is now marked 1112 alternate. The first memory region marked alternate is reinitialized 1114. The data from the second memory region marked active is copied 1116 to the first memory region marked alternate, In this way, the memory manager 138 controls the updating of the reboot memory without the need for conversion routines being performed by the other applications.

From the above description, it will be apparent that the invention disclosed herein provides a novel and advantageous system and method for persistent storage of data over a reboot for an application executable on a circuit card. The foregoing discussion discloses and describes example of methods and embodiments of the present invention. As will be understood by those familiar with the art, the invention may be embodied in other specific forms without departing from the spirit or essential characteristics thereof. Accordingly, the disclosure of the present invention intended to be illustrative, but not limiting, of the scope of the invention, which is set forth in the following claims.

What is claimed is:

1. A system of memory management for persistent storage over a reboot of a set of data from an application executing on a circuit card comprising:

a memory for persistent storage of data over a reboot, the memory being located on the circuit card; and a memory manager for directly controlling access to the memory, the memory manager executing on the circuit card, wherein the request includes a reboot state indicator indicating a state of a reboot during which the set of data is to be sent to the application.

2. The system of claim 1 wherein the memory manager has a message handler for receiving a request for storage of the set of data from the application, wherein the request includes an application identifier.

3. The system of claim 2 wherein the request includes the set of data from the application.

4. The system of claim 2 wherein the memory has a first memory region marked active and a second memory region marked alternate and the memory manager performs the following acts responsive to receiving the request for storage of the set of data from the application:

writing the set of data and its application identifier to the second memory region marked alternate;

marking the second memory region marked alternate as being active;

marking the first memory region marked active as being alternate;

copying data from the second memory region marked active to the first memory region marked alternate.

5. The system of claim 1, wherein the memory manager stores the reboot state identifier for the set of data in the memory.

6. The system of claim 5 wherein the memory has an active memory region and an alternate memory region and the memory manager performs the following responsive to a reboot of the card occurring:

performing an integrity test for the active memory region; and responsive to a successful integrity test result indicating valid data for the active memory region, providing the set of data from the active memory region to the application during the state of the reboot indicated by the stored reboot state indicator for the set of data.

7. The system of claim 6, wherein the memory manager further performs:

responsive to an unsuccessful integrity test result for the active memory region, an integrity test for the alternate memory region; and responsive to a successful integrity test result for the alternate memory region, providing the set of data from the alternate memory region to the application during the state of the reboot indicated by the stored reboot state indicator for the set of data.

8. The system of claim 5 wherein the memory comprises a cold-reboot persistence memory.

9. The system of claim 8 wherein the memory manager comprises a cold-reboot module for performing the following:

receiving a commitment indicator indicating that the set of data is to be saved to the cold-reboot persistence memory; and writing the set of data to the cold-reboot persistence memory.

10. The system of claim 1 wherein the circuit card is a node element module card having an optical element.

11. A system of memory management for persistent storage over a reboot of a set of data from an application executing on a circuit card comprising:

a memory for persistent storage of data over a reboot, the memory being located on the circuit card; and a memory manager for directly controlling access to the memory, the memory manager executing on the circuit card, wherein the memory has an active memory region and an alternate memory region and the memory manager comprises a data size change module for performing the following for adjusting for a new version of the set of data:

overwriting the alternate memory region with data from the active memory region up to a location in the alternate memory region associated with a stored version of the set of data;

at the location associated with the stored version of the set of data, writing the new version of the set of data in the alternate memory region;

writing data from a location in the active memory region located after the stored version set of data to the alternate memory region starting in a location after where the new version of the set of data has been stored;

marking the alternate memory region as the active memory region.

12. A system of memory management for persistent storage over a reboot of a set of data from an application executable on a first circuit card in a memory located on a second circuit card comprising:

the first circuit card having a first node element module for performing a payload traffic-carrying function and a first copy of a software application;

the second circuit card having a second node element module for performing a payload traffic-carrying function and a second copy of the same software application;

each card comprising a memory management system comprising a memory for persistent storage of data over a reboot, and a memory manager for directly controlling access to the memory;

the memory manager of the second card having a message handler for receiving a request from the first card for storage of the set of data from the first copy of the application in the memory of the second card, the request including an application identifier for the set of data; and the memory manager of the second card comprising instructions for storing the set of data and the application identifier in the memory of the second card responsive to the request.

13. The system of claim 12 wherein the application identifier comprises an endpoint identification identifying the second card as a destination for the set of data.

14. The system of claim 13, wherein the application identifier further comprises an object identifier identifying an object in the first copy of the software application with which the set of data is associated.

15. A method of memory management for persistent storage over a reboot of a set of data from an application executing on a circuit card comprising:

receiving from the application a request for storage of the set of data in a memory for persistent storage of data over a reboot, the memory being located on the circuit card, wherein the request includes an application identifier;

directly controlling access to the memory by a memory manager executing on the circuit card; and storing a reboot state indicator for the set of data in the memory, the reboot state indicator indicating a state of a reboot during which the set of data is to be sent to the application.

16. The method of claim 15 wherein the memory has an active memory region and an alternate memory region and wherein directly controlling access to the memory by the memory manager comprises:

writing the set of data and its application identifier to the alternate memory region;

performing an integrity test on the alternate memory region; and responsive to a successful integrity test result indicating valid data, marking the active memory region as the alternate region, and marking the alternate memory region as the active memory region.

17. The method of claim 15 wherein the memory has an active memory region and an alternate memory region, the method further comprising performing the following responsive to a reboot of the card occurring:

performing an integrity test for the active memory region; and responsive to a successful integrity test result for the active memory region, providing each set of data from the active memory region to the application during the state of the reboot indicated by the stored reboot state indicator for the set of data.

18. The method of claim 17 further performing:

responsive to an unsuccessful integrity test result for the active memory region, performing an integrity test for the alternate memory region; and responsive to a successful integrity test result for the alternate memory region, providing the set of data from the alternate memory region to the application during the state of the reboot indicated by the stored reboot state indicator for the set of data.

19. The method of claim 15, wherein the memory comprises a cold-reboot persistence memory.

20. The method of claim 19 further comprising:

receiving a commitment indicator indicating that the set of data is to be saved to the cold-reboot persistence memory; and writing the set of data to the cold-reboot persistence memory.

21. The method of claim 15 where in the circuit card is a node element module circuit card having an optical element.

22. A method of memory management for persistent storage over a reboot of a set of data from an application executing on a circuit card comprising:

receiving from the application a request for storage of the set of data in a memory for persistent storage of data over a reboot, the memory being located on the circuit card, wherein the request includes an application identifier; and directly controlling access to the memory by a memory manager executing on the circuit card, wherein the memory is a memory having an active memory region and an alternate memory region and the method further comprises performing the following for adjusting for a new version of a set of data:

overwriting the alternate memory region with data from the active memory region up to a location in the alternate memory region associated with a stored version of the set of data;

at the location with the stored version of the set of data, writing the new version of the set of data in the alternate memory region;

writing the data from a location in the active memory region located after a stored version of the set of data to the alternate memory region starting in a location after where the new version of the set of data has been stored; and marking the alternate memory region as the active memory region.

23. In a system of memory management for persistent storage over a reboot of a set of data from an application executing on a first circuit card in a memory located on a second circuit card wherein the first circuit card has a first node element module having an optical element and a first copy of the application, the second circuit card has a second node element module having an optical element and a second copy of the same application, and each card comprises a memory management system comprising a memory for persistent storage of data over a reboot, and a memory manager for directly controlling access to the memory on that card, a method of memory management for persistent storage over a reboot of the set of data from the application executing on the first circuit card in the memory located on the second circuit card comprising:

receiving a request by the memory manager of the second card from the first card for storage of the set of data from the first copy of the application in the memory of the second card, the request including an application identifier for the set of data; and storing the set of data and the application identifier in the memory of the second card responsive to the request.

24. The method of claim 23 wherein the application identifier comprises an endpoint identification identifying the second card as a destination for the set of data.

25. The method of claim 23 wherein the application identifier further comprises an object identifier identifying an object in the first copy of the application with which the set of data is associated.

26. A computer readable medium comprising instructions embodied thereon, which when executed by a processor cause the processor to perform a method of memory management for persistent storage of a set of data from an application executing on a circuit card, the method comprising:

receiving from the application a request for storage of the set of data in a memory for persistent storage over a reboot, the memory being located on the circuit card, wherein the request includes an application identifier; and directly controlling access to the memory by a memory manager executing on the circuit card wherein the request includes a reboot state indicator indicating a state of a reboot during which the set of data is to be sent to the application.

* * * * *